US010115266B2

(12) United States Patent
Shaik

(10) Patent No.: US 10,115,266 B2
(45) Date of Patent: Oct. 30, 2018

(54) GAMING MACHINE USING RANDOMLY TRIGGERED SYMBOL ARRAY ELEMENT REMOVAL AND REPOPULATION

(71) Applicant: BALLY GAMING, INC., Las Vegas, NV (US)

(72) Inventor: Shayer Waseem Abdul Raheem Shaik, Marharashtra (IN)

(73) Assignee: Bally Gaming, Inc., Las Vegas, NV (US)

( * ) Notice: Subject to any disclaimer, the term of this patent is extended or adjusted under 35 U.S.C. 154(b) by 157 days.

(21) Appl. No.: 15/138,901

(22) Filed: Apr. 26, 2016

(65) Prior Publication Data

US 2016/0328910 A1 Nov. 10, 2016

Related U.S. Application Data

(60) Provisional application No. 62/156,698, filed on May 4, 2015.

(51) Int. Cl.
*A63F 13/00* (2014.01)
*G07F 17/32* (2006.01)

(52) U.S. Cl.
CPC ........ *G07F 17/3244* (2013.01); *G07F 17/326* (2013.01)

(58) Field of Classification Search
CPC ........................... G07F 17/3244; G07F 17/326
See application file for complete search history.

(56) References Cited

U.S. PATENT DOCUMENTS

| | | | | |
|---|---|---|---|---|
| 3,733,075 A | 5/1973 | Hooker et al. | .......... | G07F 17/34 |
| 5,342,047 A | 8/1994 | Heidel et al. | .......... | A63F 13/06 |
| 5,769,716 A | 6/1998 | Saffari et al. | .......... | G07F 17/34 |
| 5,833,537 A | 11/1998 | Barrie | ..................... | G07F 17/34 |
| 5,951,397 A | 9/1999 | Dickinson | ............... | G07F 17/32 |
| 6,641,477 B1 | 11/2003 | Dietz, II | ................. | G07F 17/34 |
| 6,731,313 B1 | 5/2004 | Kaminkow | ............. | A63F 13/00 |
| 6,910,962 B2 | 6/2005 | Marks et al. | ........... | G07F 17/32 |

(Continued)

FOREIGN PATENT DOCUMENTS

| | | | | |
|---|---|---|---|---|
| GB | 2 097 160 A | 10/1982 | ............. | G07F 17/34 |
| GB | 2 144 568 A | 3/1985 | ......... | G07F 17/3265 |
| GB | 2 251 112 A | 6/1992 | ......... | G07F 17/3209 |

*Primary Examiner* — James S McClellan
(74) *Attorney, Agent, or Firm* — Grant A. Dingledine

(57) ABSTRACT

A gaming system includes an electronic input device, an electronic display device, and game-logic circuitry performing at least one regulated casino wagering game. The wagering game employs an array of symbols defining an outcome of the wagering game having a corresponding award granted in response to the outcome meeting one or more winning criterion. When randomly triggered, one or more regions of the outcome are designated and a set of symbols are removed from the array. A region of the array may be determined by position or placement of a feature symbol. The remaining symbols are aggregated into one or more sets of adjacent symbols and empty portions of the array are repopulated with additional symbols to generate an additional outcome having an additional award granted in response to meeting one or more winning criterion. The additional symbols may be chosen using a weighted table and may include symbols not available for the initial outcome.

20 Claims, 9 Drawing Sheets

(56) References Cited

U.S. PATENT DOCUMENTS

| | | | | |
|---|---|---|---|---|
| 7,195,559 | B2 | 3/2007 | Gilmore et al. | G07F 17/34 |
| 7,252,591 | B2 | 8/2007 | Van Asdale | A63F 9/24 |
| 7,666,085 | B2 | 2/2010 | Vorias | A63F 9/24 |
| 7,749,063 | B2 | 7/2010 | Belger et al. | A63F 9/24 |
| 8,192,275 | B2 | 6/2012 | Aoki et al. | A63F 13/00 |
| 2004/0048646 | A1 | 3/2004 | Visocnik | A63F 9/24 |
| 2004/0048650 | A1 | 3/2004 | Mierau et al. | G07F 17/34 |
| 2004/0048651 | A1 | 3/2004 | Vorias et al. | G07F 17/34 |
| 2006/0046830 | A1 | 3/2006 | Webb | A63F 9/24 |
| 2006/0068881 | A1 | 3/2006 | Casey | A63F 13/00 |
| 2006/0068886 | A1 | 3/2006 | Takano et al. | A63F 13/00 |
| 2007/0026933 | A1 | 2/2007 | Tanimura | A63F 13/00 |
| 2007/0155474 | A1 | 7/2007 | Gauselmann | A63F 13/00 |
| 2008/0051174 | A1 | 2/2008 | Fiden | A63F 13/00 |
| 2009/0069071 | A1* | 3/2009 | Aoki | G07F 17/34<br>463/20 |
| 2011/0111825 | A1* | 5/2011 | Caputo | G07F 17/3265<br>463/20 |
| 2013/0190066 | A1* | 7/2013 | Saunders | G07F 17/3213<br>463/20 |

* cited by examiner

GAMING MACHINE USING RANDOMLY TRIGGERED SYMBOL ARRAY ELEMENT REMOVAL AND REPOPULATION

RELATED APPLICATIONS

This patent application claims the priority benefit of U.S. Provisional Patent Application Ser. No. 62/156,698, filed May 4, 2015 and entitled "GAMING MACHINE USING RANDOMLY TRIGGERED SYMBOL ARRAY ELEMENT REMOVAL AND REPOPULATION", incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming systems, apparatus, and methods and, more particularly, to a gaming machine utilizing a wagering game mechanic involving the selection, removal, and repopulation of symbols in a symbol array as part of a wagering game outcome, thereby enhancing player anticipation, entertainment, and enjoyment of the wagering game.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

SUMMARY OF THE INVENTION

According to one aspect of the present invention, a gaming system comprises a casino gaming machine, a random number generator, and game-logic circuitry. The gaming system may be incorporated into a single, freestanding gaming machine. The casino gaming machine includes a secure gaming cabinet, an electronic display device, and an electronic input device. The gaming cabinet is constructed to house components associated with the casino wagering game. The electronic display device and the electronic input device are coupled to the gaming cabinet. The electronic input device is configured to receive a physical input from a player to initiate the casino wagering game and transform the input into an electronic data signal. The random element generator is configured to generate one or more random elements. The game-logic circuitry is configured to initiate the casino wagering game in response to the electronic data signal from the electronic input device. The game-logic circuitry determines an outcome of the casino wagering game based, at least in part, on the one or more random elements, directs the electronic display device to display a plurality of symbols in a symbol array determined by the outcome, and grants an award for any winning symbol combinations displayed in the symbol array. In response to an occurrence of a trigger including at least one feature symbol displayed in the symbol array based, at least in part, on the one or more random elements, the game-logic circuitry removes the at least one feature symbol and one or more symbols associated with the at least one feature symbol from the symbol array, aggregates the remaining symbols in the symbol array into one or more groups of adjacent symbols in the symbol array, repopulates each portion of the symbol array lacking a symbol with a corresponding replacement symbol to generate a repopulated symbol array based, at least in part, on the one or more random elements, and grants a supplemental award for any winning symbol combinations displayed in the repopulated symbol array.

According to another aspect of the invention, a computer-implemented method of operating a gaming system primarily dedicated to playing at least one regulated casino wagering game is disclosed. The gaming system includes a random element generator, game-logic circuitry, and a casino gaming machine. The casino gaming machine includes a secure gaming cabinet, an electronic display device, and an electronic input device. The gaming cabinet is constructed to house components associated with the casino wagering game. The electronic display device and the electronic input device are coupled to the gaming cabinet. The method includes receiving, by the game-logic circuitry, responsive to a physical input to the electronic input device of the casino gaming machine, a wager input to initiate the casino wagering game, generating, by the random element generator, one or more random elements, determining, by the game-logic circuitry, an outcome of the casino wagering game based, at least in part, on the one or more random elements, displaying a plurality of symbols in a symbol array on the electronic display device of the casino gaming machine, the plurality of symbols in the symbol array being determined by the outcome, and granting, by the game-logic circuitry, an award for any winning symbol combinations displayed in the symbol array. In response to an occurrence of a trigger based, at least in part, on the one or more random elements including at least one feature symbol displayed in the symbol array, the game-logic circuitry removes the at least one feature symbol and one or more symbols associated with the at least one feature symbol from the symbol array, aggregates the remaining symbols in the symbol array into one or more groups of adjacent symbols in the symbol array, repopulates each portion of the symbol array lacking a symbol with a corresponding replacement symbol to generate a repopulated symbol array, and grants a supplemental award for any winning symbol combinations displayed in the repopulated symbol array.

According to one aspect of the present invention, a casino gaming machine primarily dedicated to playing at least one regulated casino wagering game is disclosed. The gaming machine includes a gaming cabinet, an electronic display device, an electronic input device, and game-logic circuitry. The gaming cabinet houses components associated with the casino wagering game. The electronic display device is coupled to the gaming cabinet. The electronic input device is coupled to the gaming cabinet and is configured to receive a physical input from a player to initiate the casino wagering game and transform the input into an electronic data signal. The game-logic circuitry is disposed within the gaming cabinet and includes a random element generator. The random element generator is configured to generate one or more random elements. The game-logic circuitry is configured to initiate the casino wagering game in response to the electronic data signal from the electronic input device, determine an outcome of the casino wagering game based, at least in part, on the one or more random elements, direct the electronic display device to display a plurality of symbols in a symbol array determined by the outcome, and grant an award for any winning symbol combinations displayed in the symbol array. In response to an occurrence of a trigger based, at least in part, on the one or more random elements, the game-logic circuitry replaces at least one symbol in the symbol array with at least one feature symbol, removes the at least one feature symbol and one or more associated symbols from the symbol array, aggregates the remaining symbols in the symbol array into one or more groups of adjacent symbols in the symbol array, repopulates each portion of the symbol array lacking a symbol with a corresponding replacement symbol to generate a repopulated symbol array, and grants a supplemental award for any winning symbol combinations displayed in the repopulated symbol array.

Additional aspects of the invention will be apparent to those of ordinary skill in the art in view of the detailed description of various embodiments, which is made with reference to the drawings, a brief description of which is provided below.

Figure 1:
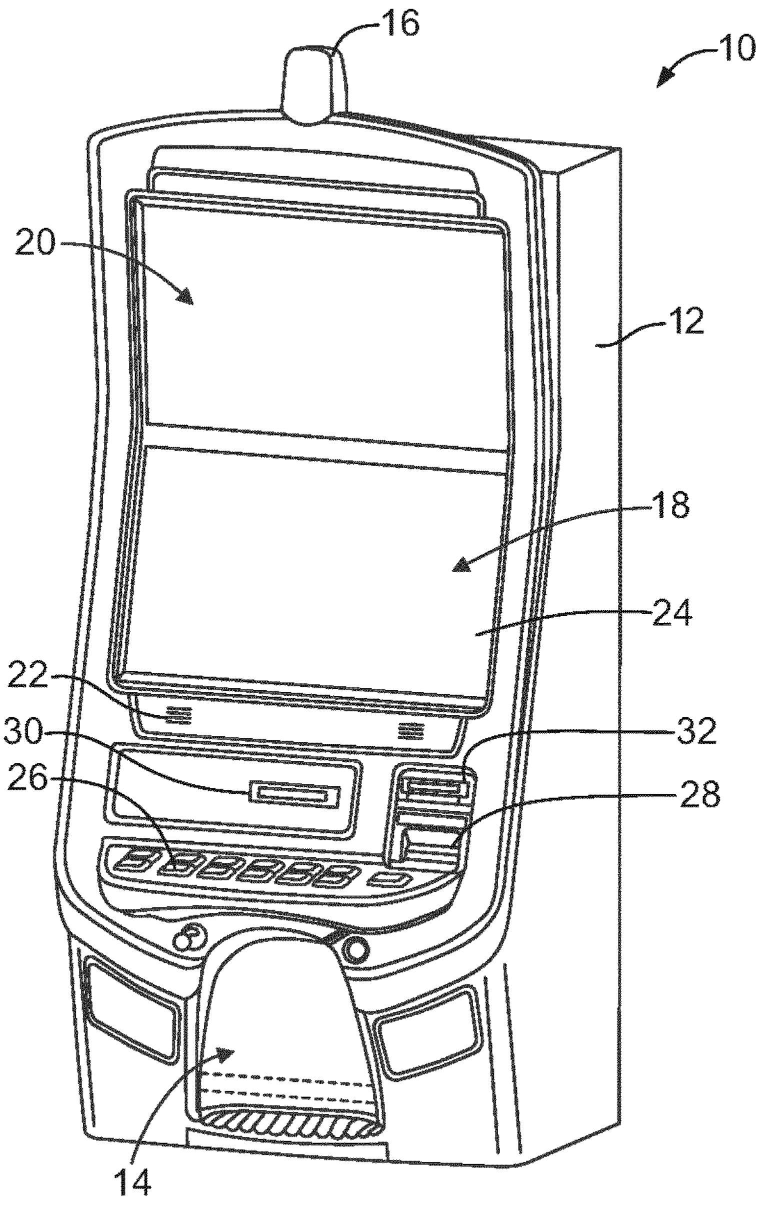
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. The value input devices are used to deposit cash or credits onto the gaming machine 10. The cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. The value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
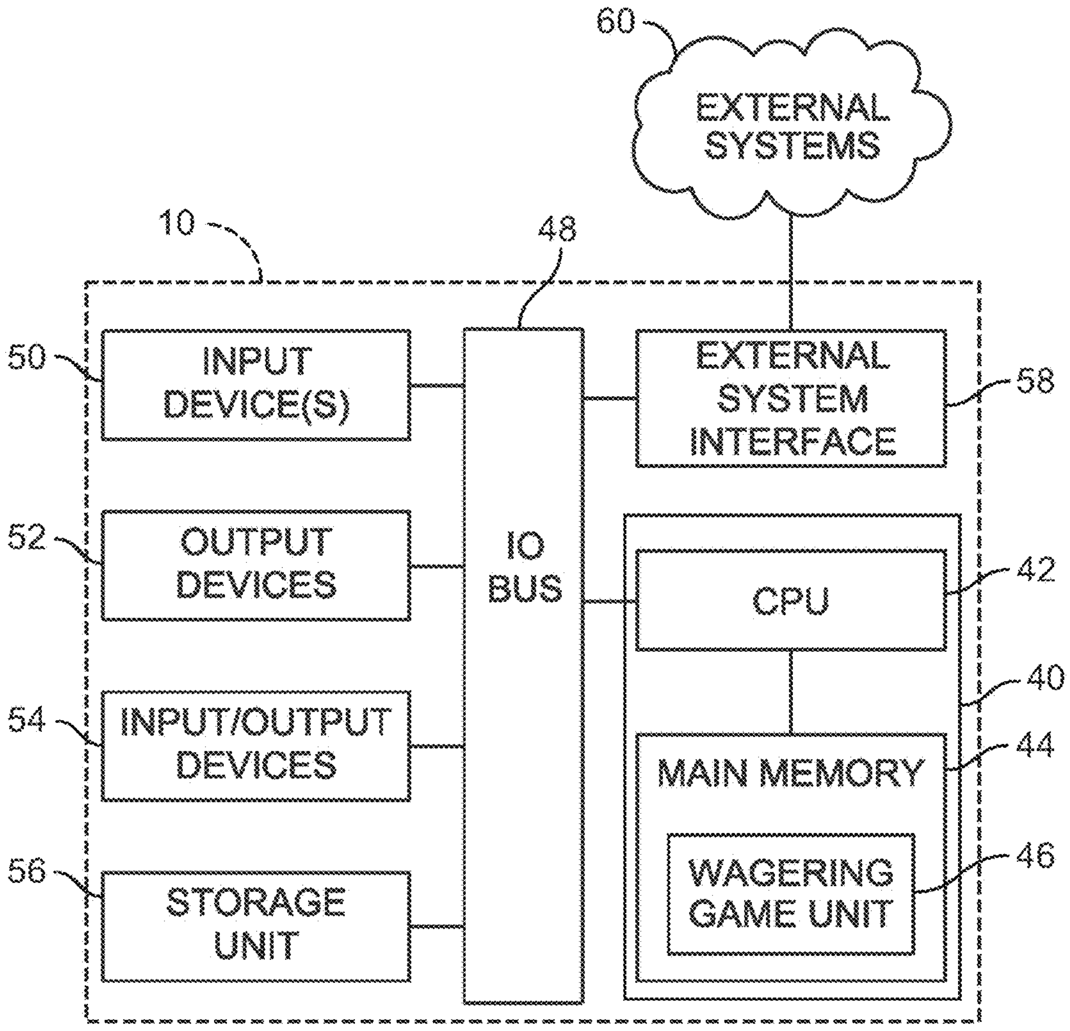
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compares it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
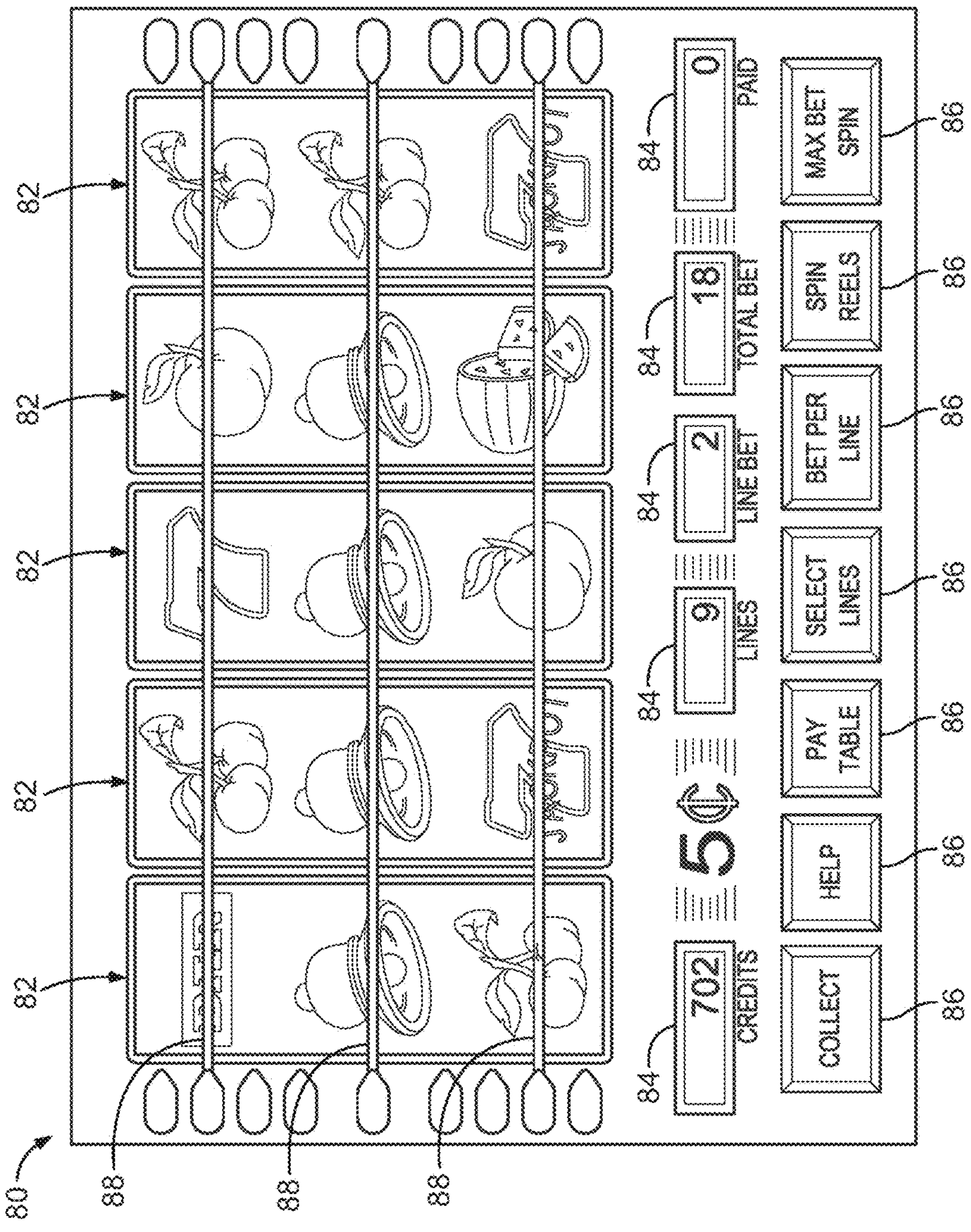
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
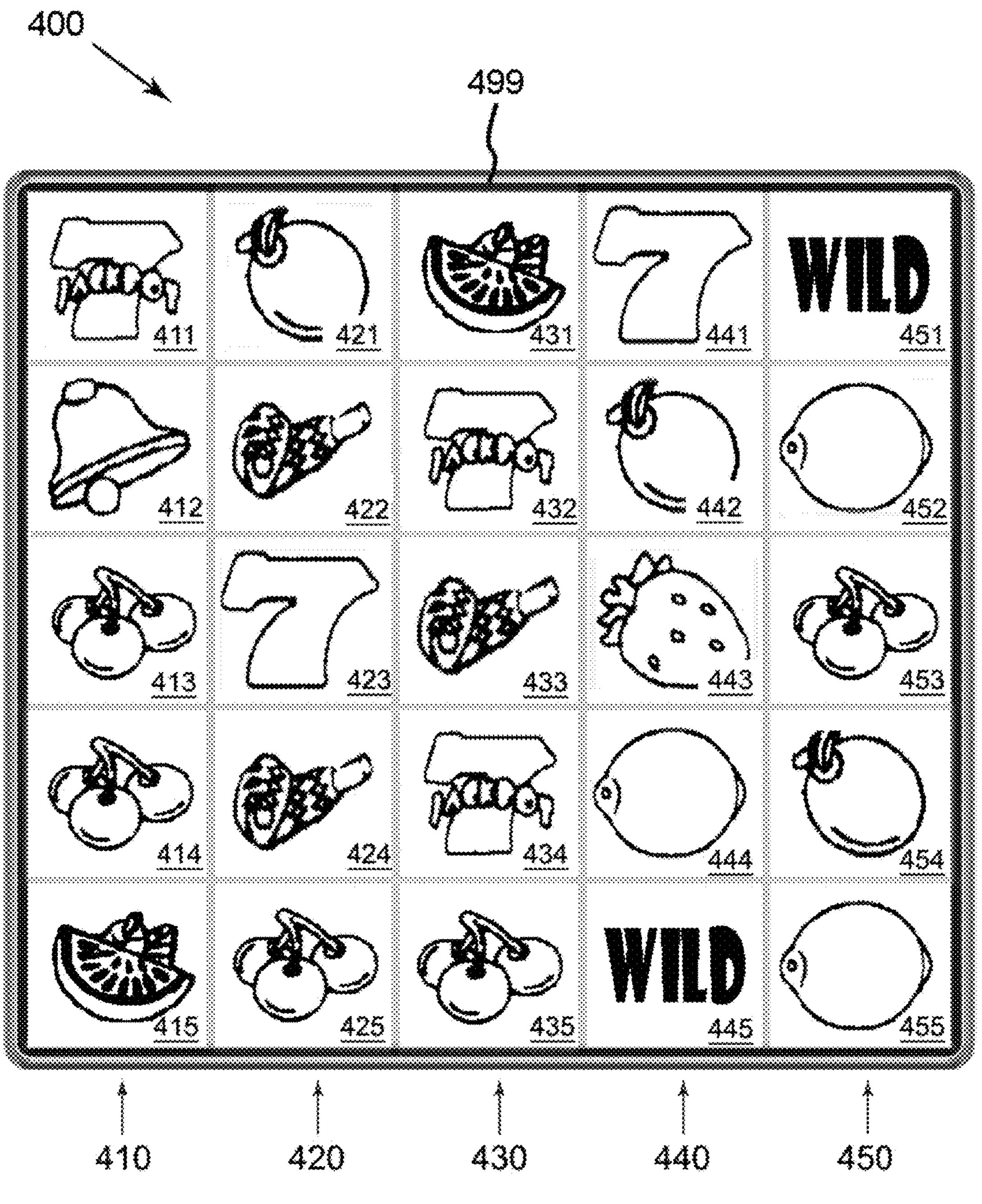
FIG. 4 is an image of an exemplary symbol array of a wagering game displayed on a gaming machine, according to an embodiment of the present invention.

Referring now to FIG. 4, an exemplary symbol array 499 of a wagering game as displayed in a section 400 of an electronic display screen on a gaming machine is shown according to one embodiment. In this embodiment, the wagering-game symbol array 499 has five columns 410, 420, 430, 440, 450, each column having a corresponding number of symbol array elements. For example, column 410 of the symbol array 499 contains five symbol-array elements 411-415.

Each of the symbol-array elements 411-415, 421-425, 431-435, 441-445, and 451-455 of the symbol array 499 displays a corresponding symbol selected (i.e., determined) from a set of available symbols for the particular element of the symbol array 499. Selection of the symbol displayed by a symbol-array element is commonly based, at least in part, on one or more random elements generated by the game-logic circuitry 40 (e.g., the RNG). The symbols generated and selected for display by elements of the symbol array 499 may be related to other elements of the symbol array 499 in some way, for example, by using a common reel having a defined reel strip spanning all the elements of the row 410. In this case, symbol-array elements 411-415 may be displayed simultaneously, eventually reflecting the (outcome) symbol(s) corresponding to where the corresponding reel has stopped (revealing a specific symbol for each of the symbol array elements 411-415 of row 410). The same process may occur, using the same or different reels (i.e., having the same or different reel strips), for each of the rows 420, 430, 440, and 450. Alternatively, each element of the symbol array 499 may have outcome symbols that are independently determined, for example, from a specific reel having a given reel strip particular to the corresponding element of the symbol array 499. That is, each of the symbol-array elements 411-415, 421-425, 431-435, 441-445, and 451-455 may use a particular reel to determine an outcome symbol. The symbols making up the initial wagering-game outcome displayed by the symbol array 499 in FIG. 4 may involve the use of any number or combination of identical or different reels (e.g., having reels varying in size, composition, and corresponding reel strip) to determine the symbol outcome for one or more of the elements of the symbol array 499. For example, the symbol array 499 may be populated with symbols derived from twenty-five distinct reels, each reel using a different reel strip, a single reel having a reel strip spanning all of the elements of the symbol array 499 in a given order, or any combination of individual reels and corresponding defined reel strips. Further, the one or more random elements may be combined with use of weighted tables, symbol-selection algorithms, etc., to populate the symbol array 499 with symbols and generate a corresponding initial wagering-game outcome for the wagering game.

An initial wagering-game outcome may be determined based on the combination of symbols displayed in the symbol array 499 after all of the elements of the symbol array 499 are populated with the initial-outcome symbols. As detailed prior, the wagering-game outcome may include comparison of the symbol combinations of the symbol array 499 using a pay table specifying particular winning combinations, for example, "line pays," "scatter pays," "cluster pays," etc. Once the wagering-game outcome is determined, an accompanying award is awarded to the player in response to the combination of symbols in the symbol array 499 in accordance with any winning symbol combination(s) specified in the pay table.

Figure 5:
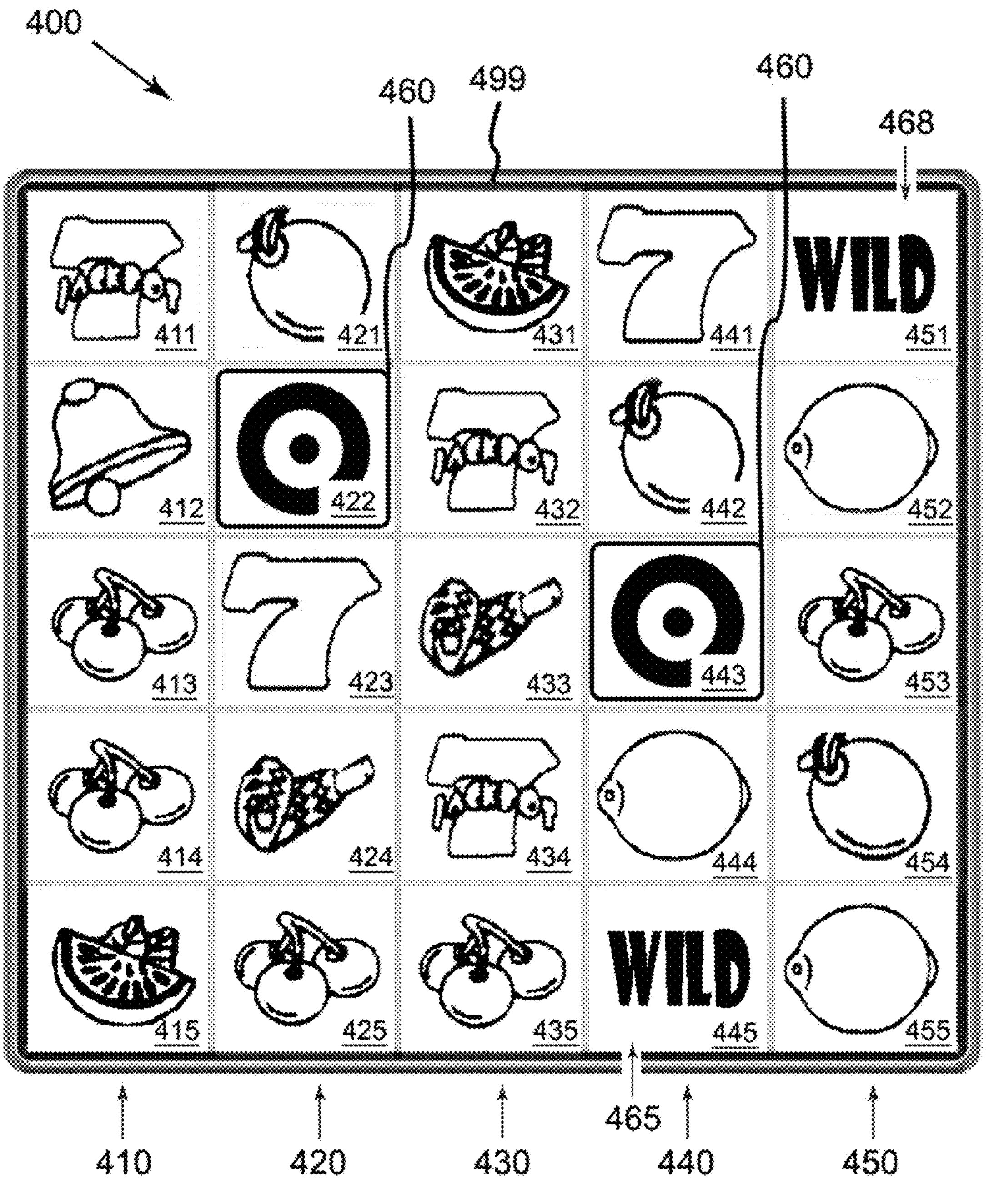
FIG. 5 is an image of an exemplary symbol array of a wagering game displayed on a gaming machine having displayed feature symbols, according to an embodiment of the present invention.

Referring now to FIG. 5, an image of the symbol array 499 of a wagering game as displayed in a section 400 of an electronic display screen on a gaming machine is shown. The symbol array 499 additionally includes a set of feature symbols 460, indicating a process of symbol removal and repopulation will take place in the wagering game. The wagering game shown in FIG. 5 follows the determination of the initial wagering-game outcome (and associated granted award) detailed in regard to FIG. 4 above.

The feature symbols 460 can appear in response to a specific triggering event or triggering condition. That is, the inclusion of the feature symbols 460 as part of the symbol array 499 may occur as a result of one or more triggers, such as specific game events or game conditions, as part of the wagering game. In one embodiment, the feature symbol(s) 460 may replace one or more symbols of the symbol array 499 when a triggering condition of no winning combination of symbols in the symbol array 499 occurs. In another embodiment, one or more feature symbols 460 in the symbol array 499 may occur as a result of spinning and stopping corresponding reels and the feature symbols 460 are part of the initial wagering-game outcome. In another embodiment, the features symbols 460 are target symbols that become feature symbols 460 as a result of one or more generated random numbers, wagering game events, or other conditions. For example, a particular symbol may become (or be designated) a feature symbol 460 as a result of an event or condition. One or more feature symbols 460 in the wagering game outcome may also be a result of a weighted table selection based on one or more random numbers for the wagering game, or another randomly determined event enhancing the winnings of the wagering game (e.g., a bonus game or bonus feature).

In one embodiment, one or more symbols of the symbol array 499 transform into (or are otherwise visually replaced with) a feature symbol 460. In another embodiment, a particular type of symbol displayed in the symbol array 499 may become a feature symbol 460. In another embodiment, a symbol at a particular location of the symbol array 499 may become a feature symbol 460. In another embodiment, the feature symbol(s) 460 may float above, fly about, or shift among the symbols of the symbol array 499, prior to landing or stopping on one or more symbols of the symbol array 499 that are then replaced with the feature symbol(s) 460. The display of the feature symbols 460 may include an accompanying anticipatory animation and audio sequence (or something similar) to alert the player that a special feature or gaming process is occurring (i.e., that the triggering event or condition has occurred). Once the feature symbol(s) 460 are displayed in the symbol array 499, a process is performed that selects a set of the symbols of the symbol array 499 for removal and repopulation.

In one embodiment, the selection process may include selection of all the symbols in the row and column of the symbol array 499 that include the feature symbol 460. In other embodiments, the symbols of the symbol array 499 that are associated with the feature symbol 460, for example, in the same row, same column, or other fixed pattern may dictate the symbols to be selected for removal and repopulation. For example, a fixed pattern of symbols may include horizontally, vertically, and/or diagonally adjacent symbol elements of the symbol array 499.

Some symbols of the symbol array 499 may be WILD. For example, symbol array element 445 displays a WILD symbol 465, and symbol array element 451 displays a WILD symbol 468. The WILD symbols 465, 468 may be considered a symbol that emulates one or more other symbols helping to fulfill one or more winning combinations of the symbol array 499. In one embodiment, WILD symbols 465, 468 may emulate other symbols displayed in the symbol array 499. In another embodiment, WILD symbols 465, 468 may emulate symbols that populate the reel strips of one or more reels of the symbol array 499, even if none of those symbols are currently displayed in the symbol array 499. In the current embodiment, the WILD symbols 465, 468 are capable of emulating any symbol other than the feature symbol 460. In other embodiments, WILD symbols 465, 468 may be allowed to emulate the feature symbol 460, thereby triggering a corresponding removal and repopulation feature of the wagering game, for example, if a sufficient number of feature symbols 460 are displayed.

Other symbols that may appear in the symbol array 499 may include BONUS symbols (not shown) that may trigger an additional or enhancing bonus round of the wagering game (for example, free spins) when a sufficient number of BONUS symbols are displayed in the symbol array 499. The BONUS symbols may also provide another type of benefit to the player as other symbols appear in the symbol array 499 (for example, transforming symbols into WILD symbols or other symbols, even the feature symbols 460). The presence (and non-presence) of WILD symbol and BONUS symbols in the symbol array 499 may be used to dictate, trigger, or otherwise specify additional events that will occur during the wagering game. Further, the use of predetermined thresholds for awards and/or winning combinations of symbols in the symbol array 499, in addition to the direct use of one or more random elements of the wagering game may be used to control and dictate these additional events. These additional events may include one or more bonus games, special gaming features of the wagering games, manipulations of the symbol array 499, etc., that all may have an effect upon the final wagering game outcome and corresponding award(s).

Figure 6A:
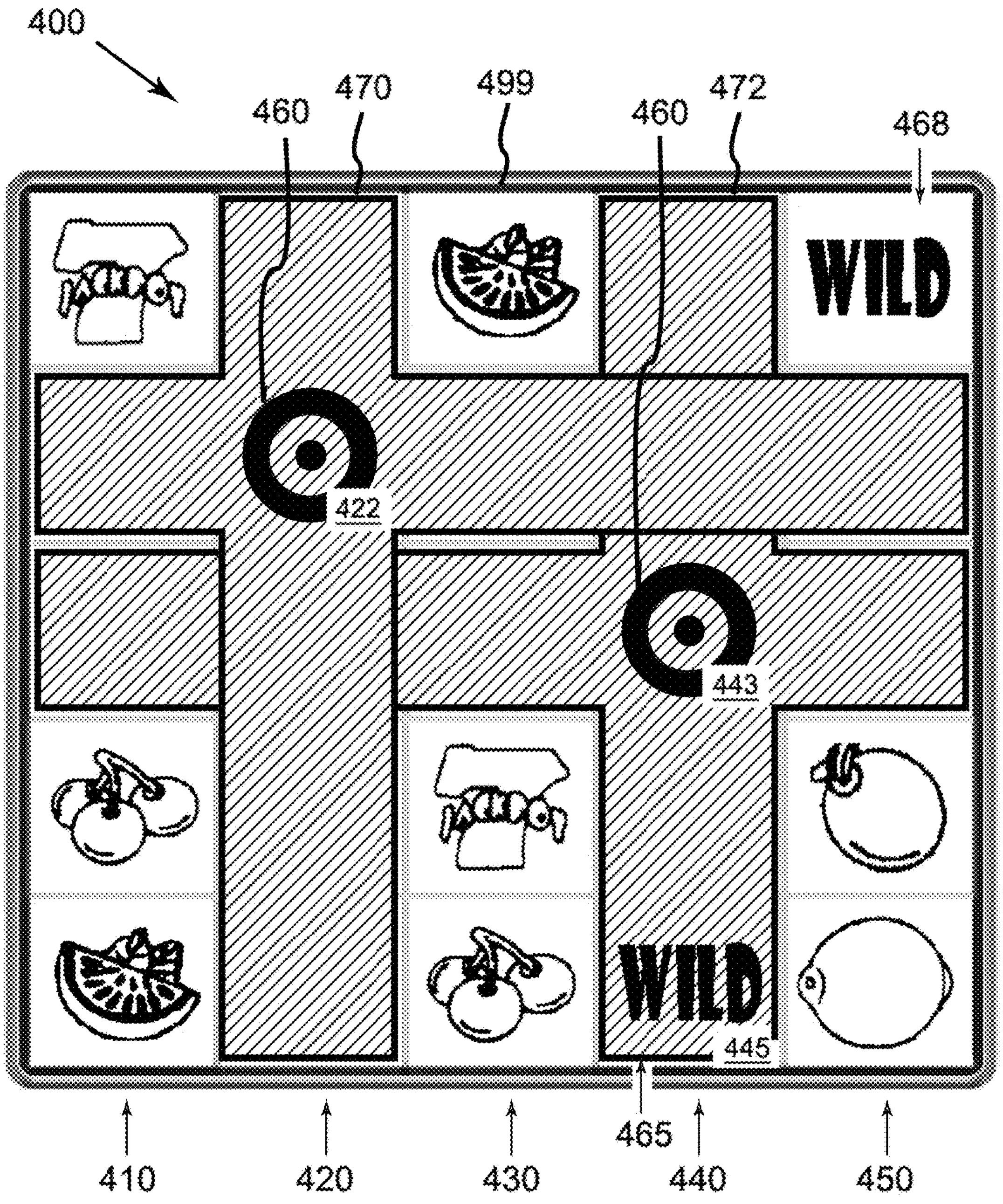
FIGS. 6A and 6B are images of an exemplary basic-game screen of a wagering game displayed on a gaming machine as symbols are selected and removed from the array, according to an embodiment of the present invention.

Referring now to FIG. 6A, the selection of the symbols of the symbol array 499 common to both the row and column of the feature symbols 460 is displayed. In one embodiment, these symbols may be highlighted or outlined such that the player may readily discern the resulting occurring selection(s). In this embodiment, the feature symbol 460 displayed in the symbol array element 422 expands to encompass the entire row and column in which it is positioned, generating a selection zone 470 of the symbol array 499. In a similar manner, the feature symbol 460 displayed in the symbol-array element 443 causes generation of a selection zone 472 including the corresponding row and column symbols common to the feature symbol 460. In other embodiments, the selection zones 470, 472 may be one of many types of arrangements that are statically or randomly determined, for example, all elements of the symbol array 499 horizontal, vertical, and/or diagonally adjacent to the feature symbol 460, or all elements of the symbol array 499 in a common horizontal, vertical, or diagonal line with the feature symbol 460.

It is noted that the WILD symbol 465 in symbol-array element 445 is included in the selection zone 472 of the symbol array 499. In the current embodiment, any WILD symbol 465 inside a selection zone 470, 472 are not removed from the symbol array 499, but may be highlighted to provide consistency in the highlighting phase of the selection. Also, since the WILD symbol 468 is outside the selection zone 470, 472, the WILD symbol 468 will not be removed. In other embodiments, any WILD symbols inside or outside one or more selection zones 470, 472 may be removed, remain in place, transform into another symbol, transform into a special symbol (to be discussed below), or even be designated to perform a special function, such as expanding into nearby elements of the symbol array (e.g., horizontally, vertically, or diagonally adjacent) or occupying a corresponding (e.g., common) row or column. Any or all of these events may occur in response to one or more generated random elements of the wagering game, and are open to the developer of the wagering game as game features that are probabilistically triggered.

Once the selection zones 470, 472 are specified and displayed, the symbols in the selection zones 470, 472 are removed from the symbol array 499 by the game-logic circuitry 40 as a part of the wagering game. The feature symbols 460 are also removed from the symbol array 499. As noted above, the WILD symbol 465 is not removed from the symbol array 499 due to its special nature and status to emulate other symbols. In other embodiments, other transformations may occur, for example, the feature symbols 460 become WILD symbols 465, or transform into a special symbol (perhaps only obtainable in this way). The removal of the selected symbols of the elements of the symbol array 499 causes a set of elements of the symbol array 499 having symbols to remain unchanged, and additionally creates a set of unpopulated elements of the symbol array 499 that no longer have symbols.

Figure 6B:
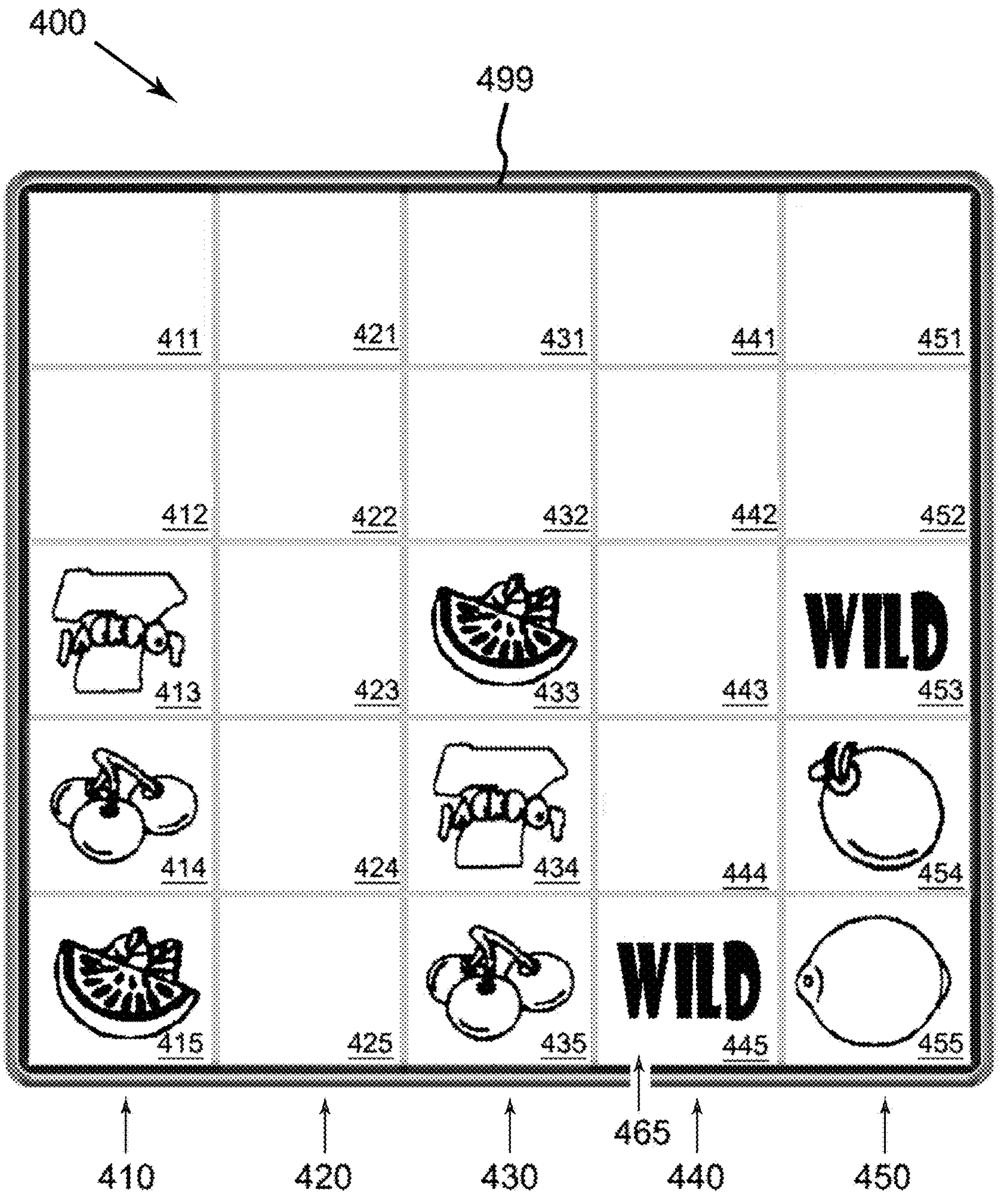

Referring now to FIG. 6B, after the symbols in the selection zones 470, 472 are removed from the symbol array 499, a repopulation process takes place to replace the symbols that have been removed as a result of the feature symbols 460. The remaining symbols are aggregated to a given section of the symbol array 499. In the current embodiment, the remaining symbols of the symbol array 499 are shifted down in their columns until the symbols cannot shift any further. Thus, the resulting symbol array 499 displayed in FIG. 6B is a result of the symbols of the symbol array elements 411, 431, and 451, shifting down to the symbol-array elements 413, 433, and 453, respectively, such that no unpopulated elements of the symbol array 499 remain between the remaining symbols. As mentioned prior, the WILD symbol 465 in the symbol-array element 445 is not removed from the symbol array 499 due to its special nature and the set of rules chosen by the game designer, and does not shift down, being already in the lowest possible location in its current column 440 of the symbol array 499.

It is noted that the aggregation of the remaining symbols is neither limited to a specific direction, nor to a particular region of the symbol array 499. For example, the symbol aggregation may result in the remaining symbols shifting to the center of the symbol array 499, to one side of the symbol array 499, or to a randomly determined section of the symbol array 499. Also, some of the symbols may not shift at all during the aggregation, for example, WILD symbol 465 and the symbols in the symbol array elements 414-415, 434-435, and 454-455 in the current embodiment. Additionally, shifting of symbols may not occur at all. In one embodiment, the symbol shifting will cause the remaining symbols of the symbol array 499 to aggregate into one or more groups of adjacent symbols in one or more regions of the symbol array 499, leaving a set of unpopulated elements of the symbol array 499 without symbols. The regions of the symbol array 499 that do not display symbols may be partitioned into various unpopulated portions. In one embodiment, each element of the symbol array 499 is considered a distinct portion.

Figure 7:
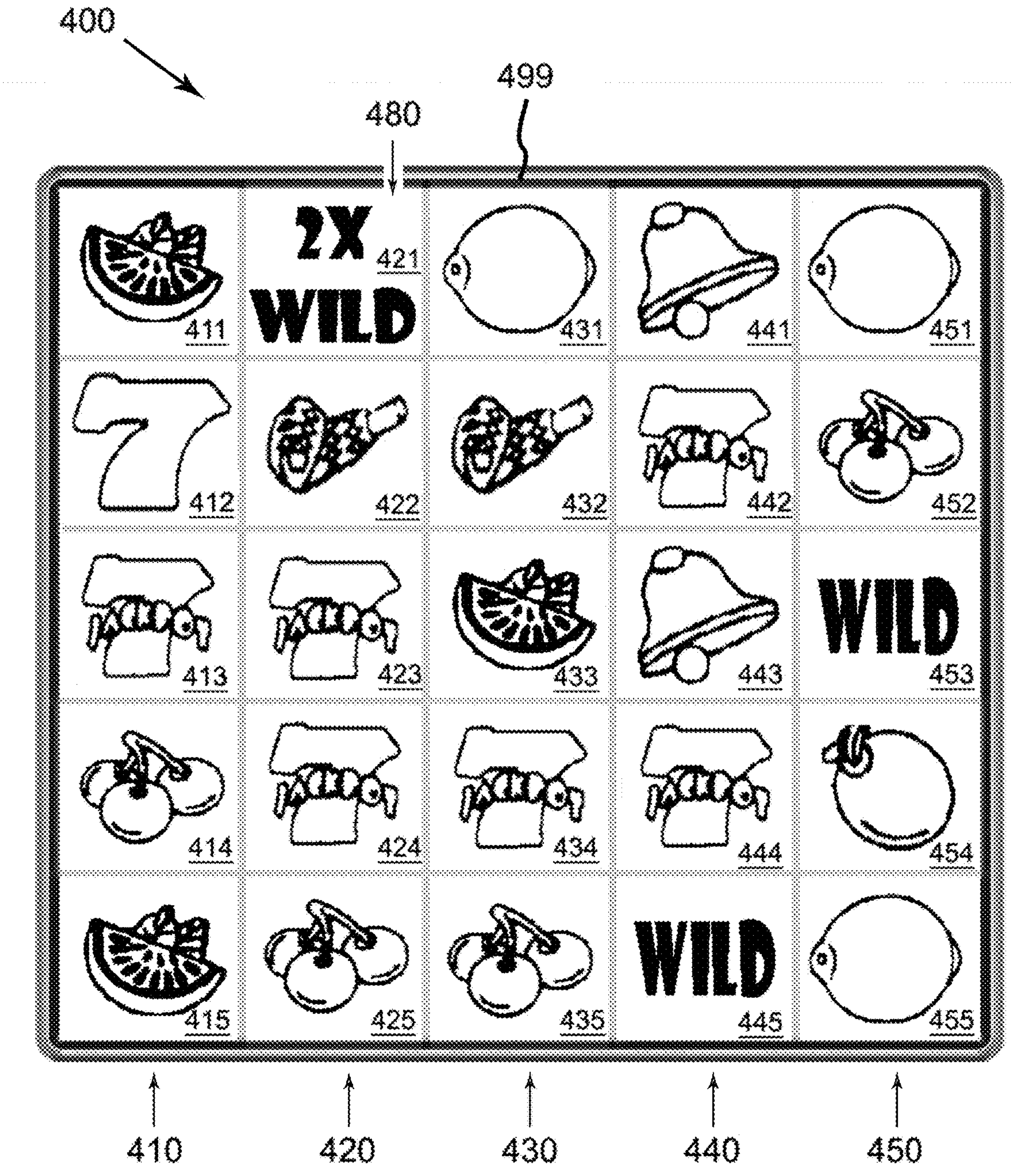
FIG. 7 is an image of an exemplary basic-game screen of a wagering game displayed on a gaming machine after the symbols of the symbol array are aggregated and the symbol array is repopulated with additional symbols, according to an embodiment of the present invention.

Referring now to FIG. 7, after the remaining symbols of the symbol array 499 are aggregated, the unpopulated portions of the symbol array 499 (i.e., the portions of the symbol array 499 that are lacking a symbol) are repopulated with replacement symbols. In one embodiment, the selection of symbols for the unpopulated elements of the symbol array 499 is based, at least in part, on the one or more random elements of the wagering game. This selection of replacement symbols for each of the elements of the symbol array 499 that are lacking a symbol may be performed in any of a number of varying methods.

Regardless of the methods employed to previously determine the initial wagering-game outcome (i.e., the method for selecting the symbols of the symbol array 499 for the prior, initial outcome used to determine a corresponding award), the repopulated symbol array may use identical, similar, or different methods for symbol selection for the one or more of the repopulated elements of the symbol array 499. For example, in one embodiment, a weighted table may be used with one or more random elements to select individual replacement symbols for each of the repopulated symbol array 499 elements that currently lack a symbol. In another embodiment, the replacement symbol(s) for one or more portions of the symbol array 499 may be determined using the one or more random elements to choose a symbol by spinning a reel. The spinning reel may be identical to or completely different from a reel used to determine the prior (original) outcome symbol for that element of the symbol array 499. That is, even though a particular set of reels may have been employed to display and populate the symbol array 499 selections displayed as part of the initial wagering-game outcome, the selections of replacement symbols for the repopulated symbol array 499 elements are not limited to use of the same reels. Additionally, the use of a weighted table, dynamically generated reels, and/or specifically defined alternative reels enables a game developer to selectively provide potential sets of replacement symbols that may be used to repopulate the elements of the symbol array 499 lacking a symbol, along with specific rules and probabilistic weightings for each of the replacement symbols.

The replacement symbols for each of the elements of the repopulated symbol array 499 may drop down into the symbol array 499 in a cascading fashion, fade in, or be otherwise presented and displayed in each corresponding element of the symbol array 499. Alternatively, one or more rotating reels may be employed to display adjusting symbols in (currently) empty sections of the symbol array 499, stopping at specific replacement symbols to repopulate those symbol array 499 elements. Additionally, adjacent elements of the symbol array 499 may include sets of identical or related replacement symbols used to repopulate one or more sections of the symbol array 499 in a unified fashion. The specifics of selection and presentation of the repopulated symbols is not restricted to those specifically recited given the spirit and scope of the invention.

In some instances, as dictated by the random elements of the wagering game, special symbols 480 may appear in one or more of the repopulated elements of the symbol array 499. For example, in the symbol array element 421, a 2X-WILD special symbol 480 is shown that is otherwise not eligible or available for selection for any of the elements of the symbol array 499 as part of the initial wagering-game outcome. That is, in one embodiment, the 2X-WILD special symbol 480 may only be selected for the symbol array 499 in response to a removal and repopulation event occurring (caused by the feature symbols 460), and the determination of an additional random element dictating the 2X-WILD special symbol 480 as a replacement symbol. Other additional special symbols may include additional symbols (e.g., feature symbols 460) that retrigger the removal and repopulation of further elements of the symbol array 499, trigger the removal and repopulation of all the elements of the symbol array 499, trigger the transition of one type of symbol into another symbol, trigger a special bonus game to occur, or trigger a chance for awarding one or more progressive jackpots, to name only a few. The retriggering of a removal and repopulation process, such as the one discussed above, may occur as a result of an additional triggering event or condition that may be the same or different from any prior triggering event or condition. It is noted that retriggering a removal and repopulation process may occur before or after any re-evaluation of the symbol array 499 (detailed below) to determine any corresponding award in response to winning combinations of the repopulated symbol array 499.

After the symbol array 499 is repopulated, the repopulated symbol array 499 is re-evaluated in accordance with the pay table to determine a corresponding award for any winning symbol combinations. For example, the pay table of the wagering game may specify that the same symbol on each of the symbol array elements 413, 424, 434, 444, and 453 of the symbol array 499 results in a specific payout in accordance with the wager amount. This winning symbol combination, along with any others specified in the pay table for the wagering game, enables the game-logic circuitry 40 to derive a corresponding award for the symbol combinations displayed in symbol array 499 shown in FIG. 7.

In some embodiments, the award for the initial wagering-game outcome (and/or the repopulated symbol array 499) may be determined with the feature symbols 460 being treated as a WILD symbol 465 prior to the upcoming removal and repopulation feature of the wagering game. Thus, a corresponding award is determined for the initial wagering-game outcome using the symbol array 499 where the feature symbols 460 are evaluated identically to the WILD symbol 465. Alternatively, an initial wagering-game outcome may be determined and a random event causes the feature symbols 460 to appear after the initial wagering-game outcome is determined. The specifics of the determination of the award of the initial wagering-game outcome, the usage and display of the feature symbols 460 during the initial and repopulated symbol array 499 evaluations, and any associated resulting effect of the presence of the feature symbol 460 are all included in the intended scope and spirit of the invention.

Figure 8:
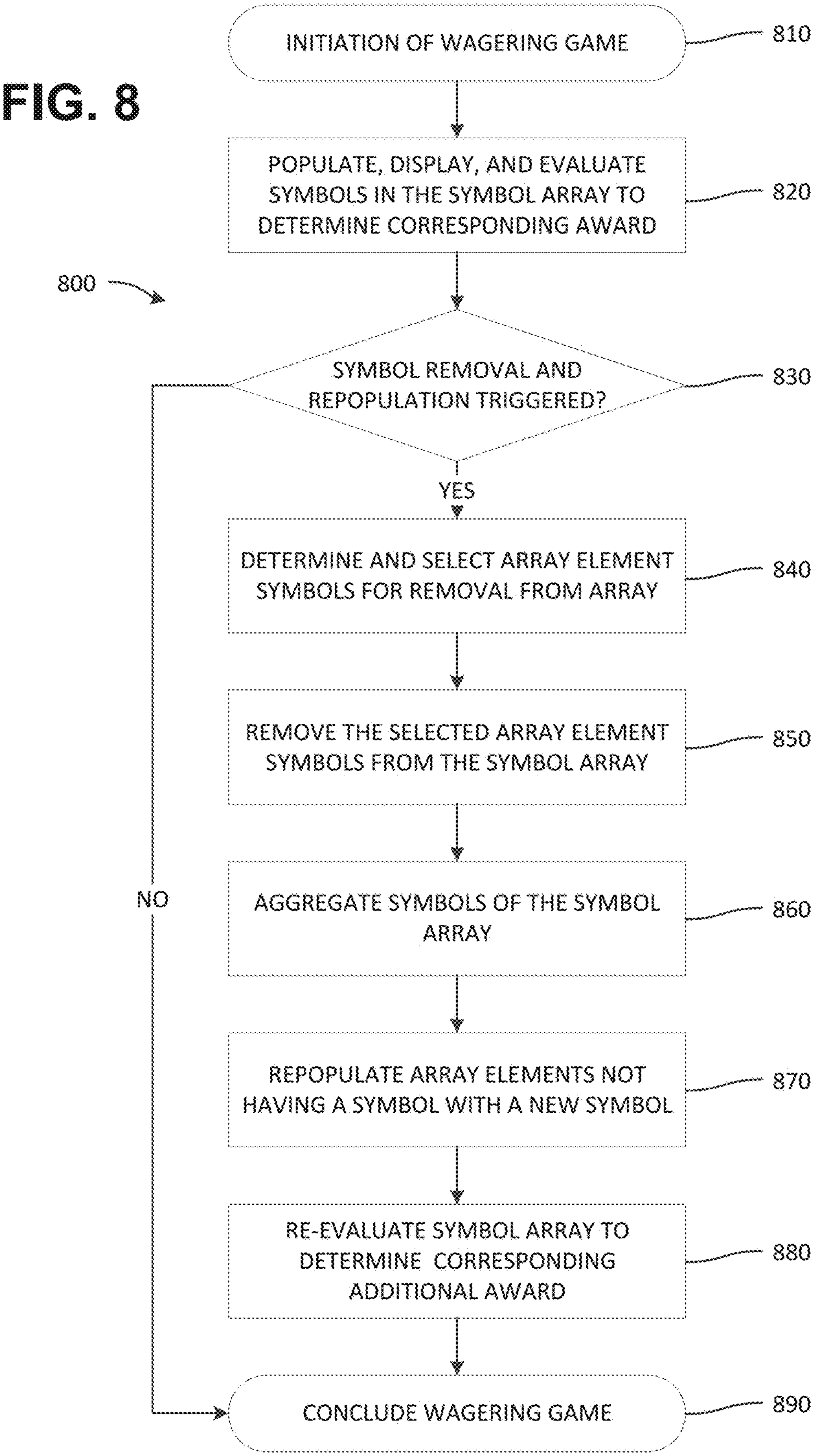
FIG. 8 is a flowchart for a data processing procedure that corresponds to instructions executed by a controller in accord with at least some aspects of the disclosed concepts.

Referring now to FIG. 8, a processing data method 800, performed by the game-logic circuitry 40, is disclosed for one embodiment.

In step 810, in response to player input, the game-logic circuitry 40 initiates an instance of the wagering game. This often involves the specification of a wager amount, a deduction of the wager amount from a player credit meter, and an indication of the beginning of the wagering game instance, etc.

In step 820, the wagering game is performed by using one or more random elements (e.g., generated by the game-logic circuitry 40) for populating a symbol array 499 with a combination of symbols using various methods. The elements of the symbol array 499 and the combination of symbols are evaluated and displayed for the player using dynamically generated, scripted, or a combination of both audio and video presentations to enhance the entertainment experience for the player. The evaluation of an initial wagering-game outcome may or may not include additional audio and video, anticipatory sounds and animation, etc. Ultimately, a corresponding award is determined for the combination of symbols of the symbol array 499 in the initial wagering-game outcome.

In step 830, a determination is made as to whether the wagering-game outcome, including any additional random events and/or corresponding symbol array 499 displayed elements, triggers a symbol removal and repopulation feature of the wagering game to occur. For example, one or more of the random elements may trigger the removal and repopulation feature to occur, resulting in a selection, highlighting or display, or placement of the feature symbol(s) 460 in the element(s) of the symbol array 499. In other cases, the feature symbol(s) 460 may already be displayed in the symbol array 499. The presence of one or more feature symbols 460 may automatically trigger the removal and repopulation feature. A random determination may further determine that one or more symbols of the symbol array be considered as feature symbols after the initial outcome and corresponding award has been displayed and accounted.

If it is determined there is no triggered symbol removal and repopulation feature for this wagering game instance, the wagering game ends by concluding the wagering game in step 890.

In step 840, when a symbol removal and repopulation feature is triggered, the game-logic circuitry 40 uses the placement of the feature symbol(s) 460 and/or one or more of additional random elements, in combination with the specified rules for the symbol removal and repopulation feature, to determine and select the elements of the symbol array 499 that will be removed as a result of the feature. This may include a scripted or otherwise generation of animation or visual indication, associated audio, and other presentation related functions. The result of this functional step is seen in one embodiment in FIG. 6A.

In step 850, the selected array element symbols of the symbol array 499, (e.g., shown in FIG. 6A as selection zones 470, 472) are removed from the symbol array 499. The removal of symbols from the symbol array 499 may include specialized or standardized video animation and associated audio for presentation to the player. A set of unpopulated elements, each lacking symbols, are generated in the symbol array 499.

In step 860, the symbols remaining in the symbol array 499 are aggregated together in the symbol array 499 using a set of rules dependent upon design and/or random element generation and determination. The result of this functional step is seen in FIG. 6B in one embodiment. In another embodiment, the remaining symbols of the symbol array 499 may not be shifted at all, and comprise a non-changing number of aggregated symbol groups. A set of unpopulated portions remain in the symbol array 499; the symbol array 499 has remaining unpopulated elements of the symbol array 499 that lack a symbol due to the removal of the prior symbols.

In step 870, the symbol array 499 is repopulated with replacement symbols in the required elements of the symbol array 499 (i.e., the elements of the symbol array 499 that are currently lacking symbols). As seen in FIG. 7, the result is a repopulated symbol array 499 that is used to determine a repopulated symbol array 499 wagering-game outcome in one embodiment. As mentioned prior, the methods employed to repopulate the symbol array 499 may include a number of different events and considerations.

In step 880, once the repopulated symbol array 499 wagering game outcome is displayed to the player, the symbol array 499 is re-evaluated to determine the corresponding award that the new symbol combinations of the symbol array 499 specify in the pay table of the wagering game. Thus, the collection of symbols defining the symbol array 499 is (again) analyzed to determine whether any winning combinations of symbols are present in the symbol array 499. In the case of the symbol array 499 containing one or more special symbols 480 that alter the payout specified in the pay table of the wagering game, such changes are applied to the appropriate pay outs that correspond to the symbol combination of the repopulated symbol array 499.

In some instances, when the repopulated symbol array 499 dictates some kind of further action, for example, performing a bonus game or additional gaming or animation actions, the game-logic circuitry will perform these actions at this time. In the case that a retriggering of a symbol removal and repopulation event occurs (perhaps again, due to the presence of a feature symbol 460 or a separately generated random element and comparison), flow may return to step 830 to perform another sequence of the symbol removal and repopulation feature of the wagering game, potentially (further) increasing the player award and interaction with the wagering game.

In step 890, the wagering game concludes after a complete outcome for the wagering game is fully determined. A corresponding award is determined and awarded to player via a player credit meter, printed receipt, or other pay out mechanism that includes the outcome of the base portion of the wagering game (i.e., the initial wagering-game outcome) and the repopulated portion of the wagering game.

The gaming machine 10 then returns to a state where another wagering game instance may occur. This may include display of one or more defined attraction modes or other audio and display combinations altering or enticing the player to use the gaming machine 10 again.

FIG. 8, described by way of example above, represents only one data processing procedure 800 that corresponds to at least some instructions stored and executed by the game-logic circuitry 40 in FIG. 2 to perform the above described functions associated with the disclosed concepts. A multitude of other sequences of instructions and data processing methods may be employed without departing from the spirit and scope of the invention.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system primarily dedicated to playing at least one regulated casino wagering game, comprising:

a casino gaming machine including a secure gaming cabinet, an electronic display device, and one or more electronic input devices, the gaming cabinet constructed to house components associated with the casino wagering game, the electronic display device and the one or more electronic input devices being coupled to the gaming cabinet;

a random element generator configured to generate one or more random elements; and game-logic circuitry configured to:

detect, via at least one of the one or more electronic input devices, a physical item associated with a monetary value that establishes a credit balance;

initiate the casino wagering game in response to an input indicative of a wager covered by the credit balance;

determine an outcome of the casino wagering game based, at least in part, on the one or more random elements;

direct the electronic display device to display a plurality of symbols in a symbol array, the plurality of symbols in the symbol array being determined by the outcome;

in response to the displayed symbol array including a winning symbol combination, grant an award for any winning symbol combination displayed in the symbol array;

in response to the displayed symbol array including no winning symbol combinations:

identify at least one feature symbol in the displayed symbol array;

remove the at least one feature symbol and one or more symbols associated with the at least one feature symbol from the symbol array;

aggregate the remaining symbols in the symbol array into one or more groups of adjacent symbols in the symbol array;

repopulate each portion of the symbol array lacking a symbol with a corresponding replacement symbol to generate a repopulated symbol array based, at least in part, on the one or more random elements; and grant a supplemental award for any winning symbol combinations displayed in the repopulated symbol array; and receive, via at least one of the one or more electronic input devices, a cashout input that initiates a payout from the credit balance.

2. The gaming system of claim 1, wherein at least one of the plurality of symbols in the symbol array is designated as the at least one feature symbol.

3. The gaming system of claim 1, wherein the one or more symbols associated with the at least one feature symbol include at least one of a symbol common to a row of the symbol array containing the at least one feature symbol, a symbol common to a column of the symbol array containing the at least one feature symbol, a symbol adjacent to the at least one feature symbol, or a symbol associated with the at least one feature symbol based, at least in part, on the one or more random elements.

4. The gaming system of claim 1, wherein all WILD symbols and BONUS symbols common to at least one of a row containing the at least one feature symbol or to a column of the symbol array containing the at least one feature symbol are excluded from removal from the symbol array.

5. The gaming system of claim 1, wherein at least one portion of the symbol array lacking a symbol is repopulated with a corresponding replacement symbol selected from a weighted table of symbols.

6. The gaming system of claim 1, wherein at least one portion of the symbol array lacking a symbol is repopulated with a corresponding replacement symbol that is only available as part of the repopulated symbol array.

7. The gaming system of claim 6, wherein an initial set of symbols including the plurality of symbols is used to determine the outcome of the casino wagering game and a set of replacement symbols including the corresponding replacement symbol is used to repopulate the symbol array.

8. A method of operating a gaming system primarily dedicated to playing at least one regulated casino wagering game, the gaming system including a random element generator, game-logic circuitry, and a casino gaming machine, the casino gaming machine including a secure gaming cabinet, an electronic display device, and one or more electronic input devices, the gaming cabinet constructed to house components associated with the casino wagering game, the electronic display device and the electronic input devices being coupled to the gaming cabinet, the method comprising:

- detecting, via at least one of the one or more electronic input devices, a physical item associated with a monetary value that establishes a credit balance;
- receiving, by the game-logic circuitry, responsive to a physical input to at least one of the electronic input devices, a wager input indicative of a wager covered by the credit balance and initiating, by the game-logic circuitry, the casino wagering game in response to the wager input;
- generating, by the random element generator, one or more random elements;
- determining, by the game-logic circuitry, an outcome of the casino wagering game based, at least in part, on the one or more random elements;
- displaying a plurality of symbols in a symbol array on the electronic display device of the casino gaming machine, the plurality of symbols in the symbol array being determined by the outcome;
- in response to the displayed symbol array including a winning symbol combination, granting, by the game-logic circuitry, an award for any winning symbol combinations displayed in the symbol array; and
- in response to the displayed symbol array including no winning symbol combinations:
  - identifying by the game-logic circuitry, at least one feature symbol in the displayed symbol array;
  - removing, by the game-logic circuitry, the at least one feature symbol and one or more symbols associated with the at least one feature symbol from the symbol array;
  - aggregating, by the game-logic circuitry, the remaining symbols in the symbol array into one or more groups of adjacent symbols in the symbol array;
  - repopulating, by the game-logic circuitry, each portion of the symbol array lacking a symbol with a corresponding replacement symbol to generate a repopulated symbol array based, at least in part, on the one or more random elements; and
  - granting, by the game-logic circuitry, a supplemental award for any winning symbol combinations displayed in the repopulated symbol array; and
- receiving, via at least one of the one or more electronic input devices, a cashout input that initiates a payout from the credit balance.

9. The method of claim 8, further comprising designating, by the game-logic circuitry, at least one of the plurality of symbols in the symbol array as the at least one feature symbol.

10. The method of claim 8, wherein the one or more symbols associated with the at least one feature symbol include at least one of a symbol common to a row of the symbol array containing the at least one feature symbol, a symbol common to a column of the symbol array containing the at least one feature symbol, or a symbol adjacent to the at least one feature symbol.

11. The method of claim 8, wherein all WILD symbols and BONUS symbols common to at least one of a row containing the at least one feature symbol or to a column of the symbol array containing the at least one feature symbol are excluded from removal from the symbol array.

12. The method of claim 8, wherein at least one portion of the symbol array lacking a symbol is repopulated with a corresponding replacement symbol selected from a weighted table of symbols.

13. The method of claim 8, wherein at least one portion of the symbol array lacking a symbol is repopulated with a corresponding replacement symbol that is only available as part of the repopulated symbol array.

14. The method of claim 13 further comprising, in response to a trigger including the corresponding replacement symbol being a replacement feature symbol, removing at least one symbol associated with the replacement feature symbol from the repopulated symbol array.

15. A casino gaming machine primarily dedicated to playing at least one regulated casino wagering game, comprising:

- a gaming cabinet for housing components associated with the casino wagering game;
- an electronic display device and one or more electronic input devices coupled to the gaming cabinet; and
- game-logic circuitry disposed within the gaming cabinet and including a random element generator, the random element generator configured to generate one or more random elements, the game-logic circuitry configured to:
  - detect, via at least one of the one or more electronic input devices, a physical item associated with a monetary value that establishes a credit balance;
  - initiate the casino wagering game in response to an input indicative of a wager covered by the credit balance;
  - determine an outcome of the casino wagering game based, at least in part, on the one or more random elements;
  - direct the electronic display device to display a plurality of symbols in a symbol array, the plurality of symbols in the symbol array being determined by the outcome;
  - in response to the displayed symbol array including a winning symbol combination, grant an award for any winning symbol combinations displayed in the symbol array;
  - in response to the displayed symbol array including no winning symbol combinations:
    - replacing at least one symbol in the displayed symbol array with at least one feature symbol, the at least one symbol based, at least in part, on the one or more random elements;
    - remove the at least one feature symbol and one or more symbols associated with the at least one feature symbol from the symbol array;
    - aggregate the remaining symbols in the symbol array into one or more groups of adjacent symbols in the symbol array;
    - repopulate each portion of the symbol array lacking a symbol with a corresponding replacement symbol to generate a repopulated symbol array based, at least in part, on the one or more random elements; and grant a supplemental award for any winning symbol combinations displayed in the repopulated symbol array; and receive, via at least one of the one or more electronic input devices, a cashout input that initiates a payout from the credit balance.

16. The gaming machine of claim 15, wherein replacing the at least one symbol in the symbol array with at least one feature symbol occurs at a location in the symbol array based, at least in part, on the one or more random elements.

17. The gaming machine of claim 15, wherein all WILD symbols and BONUS symbols common to at least one of a row containing the at least one feature symbol or a column of the symbol array containing the at least one feature symbol are excluded from removal from the symbol array.

18. The gaming machine of claim 15, wherein at least one portion of the symbol array lacking a symbol is repopulated with a corresponding replacement symbol selected from a weighted table of symbols.

19. The gaming machine of claim 15, wherein at least one portion of the symbol array lacking a symbol is repopulated with a corresponding replacement symbol that is only available as part of the repopulated symbol array.

20. The gaming machine of claim 19, wherein an initial set of symbols including the plurality of symbols is used to determine the outcome of the casino wagering game and a set of replacement symbols including the corresponding replacement symbol is used to repopulate the symbol array.

* * * * *